United States Patent [19]
Ownby

[11] 3,763,415
[45] Oct. 2, 1973

[54] AUTOMATIC BATTERY CHARGING CONTROL DEVICE AND APPARATUS

[76] Inventor: Clifford H. Ownby, P.O. Box 6811, Houston, Tex.

[22] Filed: Dec. 2, 1968

[21] Appl. No.: 784,530

Related U.S. Application Data

[63] Continuation of Ser. No. 532,299, March 7, 1966.

[52] U.S. Cl............................ 320/6, 307/10, 307/48, 320/16, 320/53, 320/61
[51] Int. Cl. ............................................... H02j 7/14
[58] Field of Search ...................................... 320/5–7, 320/15–17, 25, 53–55, 61; 307/10, 18, 29, 48, 49

[56] References Cited
UNITED STATES PATENTS

| | | | |
|---|---|---|---|
| 2,521,969 | 9/1950 | Dugan................................ | 320/7 X |
| 3,021,469 | 2/1962 | Ganiere et al. ................... | 320/59 X |
| 3,129,372 | 4/1964 | Warren............................... | 320/15 |
| 3,341,762 | 9/1967 | Rockoff.............................. | 320/6 |

*Primary Examiner*—William H. Beha, Jr.
*Attorney*—Pravel, Wilson and Matthews

[57] ABSTRACT

An automatic battery control system for vehicles and the like, having a main battery used for motor starting and one or more auxiliary batteries, and wherein each of such batteries is connected to a diode or rectifier, and wherein the two or more diodes or rectifiers are connected to a common terminal which is connected to a generator, whereby the main and auxiliary batteries may be discharged independently of each other at their respective loads, and may be charged automatically from the common generator source, with the diodes or rectifiers preventing the batteries from discharging back through the common terminal.

2 Claims, 6 Drawing Figures

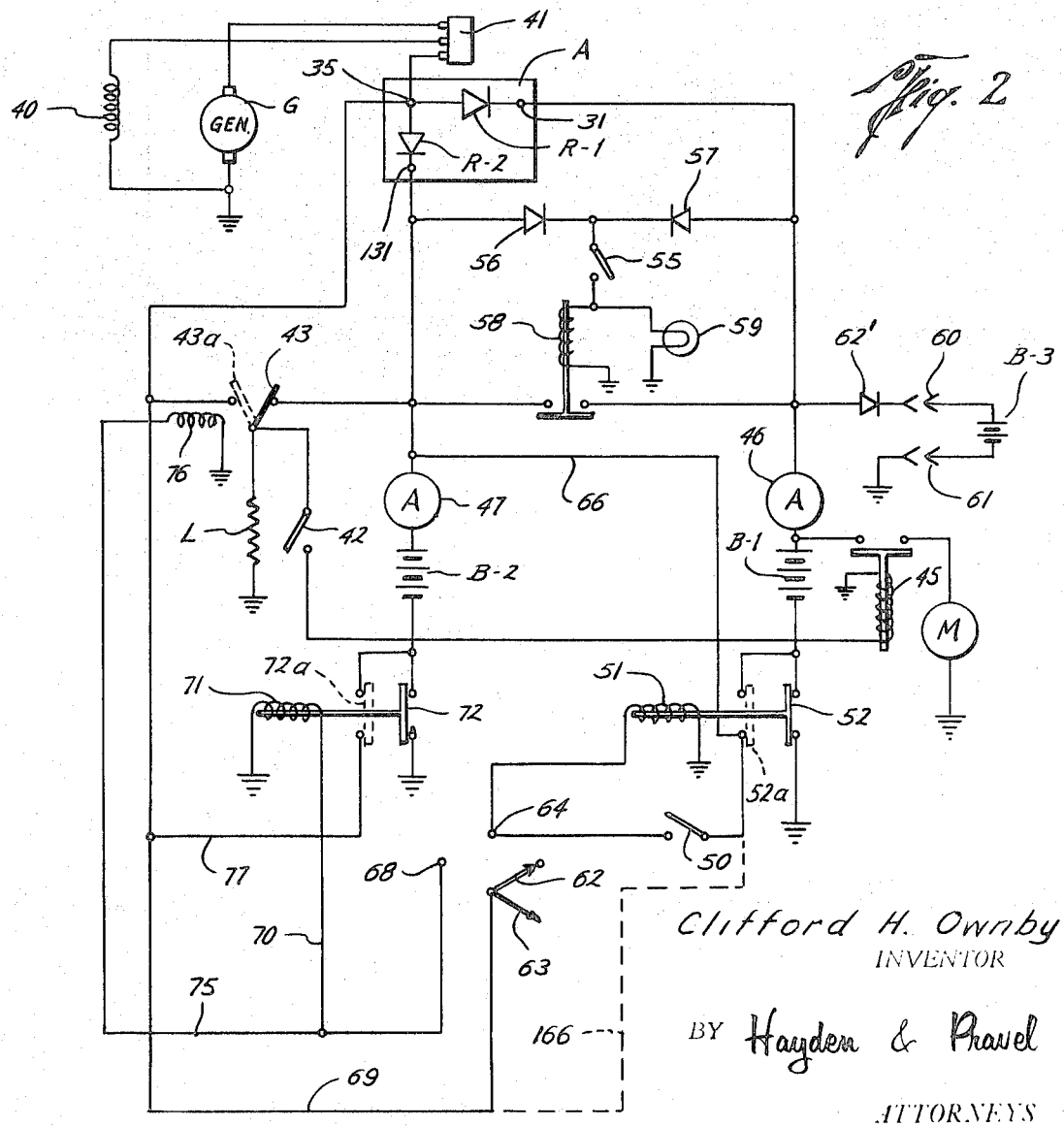

Clifford H. Ownby
INVENTOR.

BY Hayden & Pravel

ATTORNEYS

AUTOMATIC BATTERY CHARGING CONTROL DEVICE AND APPARATUS

This application is a continuation of my copending U. S. Patent application Ser. No. 532,299 filed Mar. 7, 1966.

An object of this invention is to provide apparatus in combination with a new and improved automatic battery charging control device for various applications wherein a plurality of batteries are connected together for automatically electrically charging same with a common generator or alternator as needed and for electrically discharging same independently of each other as used.

A further object of this invention is to provide an electrical system for a vehicle, boat or other unit having an engine which is started with battery power from a first or main battery, wherein such system includes a second or auxiliary battery which may be used for operating electrical accessories on or in conjunction with the vehicle, boat or other unit without discharging the first or main battery or otherwise causing it to lose its starting power for starting the engine, both of such batteries being electrically connected to an automatic battery charging control device for charging same when the vehicle, boat or other unit is operating.

Another object of this invention is to provide a device which may be added to and used in conjunction with existing auto generators and alternators, without modifying the regulator circuit and with only minor changes in wiring.

The preferred embodiment of this invention will be described hereinafter, together with other features thereof, and additional objects will become evident from such description.

The invention will be more readily understood from a reading of the following specification and by reference to the accompanying drawings forming a part thereof, wherein an example of the invention is shown, and wherein:

FIG. 1 is an elevation of a typical installation wherein the present invention may be utilized;

FIG. 2 is a schematic electrical diagram illustrating one electrical system which may utilize the present invention;

Figure 3:
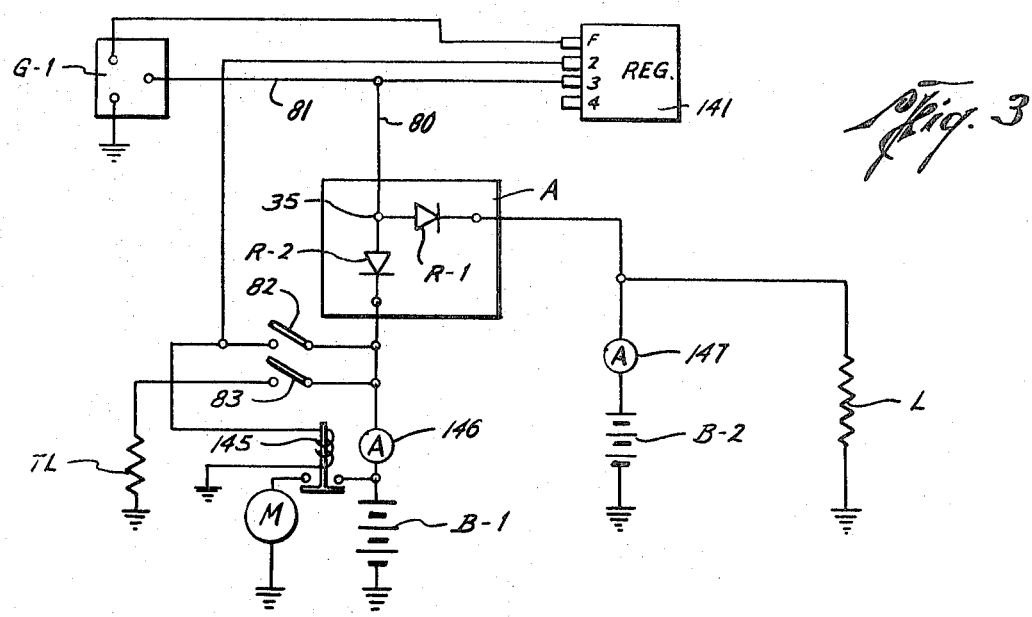
FIG. 3 is a modified electrical circuit wherein the automatic battery charging control device is utilized.

In the drawings, the letter A designates generally the automatic battery charging control device of this invention. By way of illustration, the device A is illustrated in FIG. 1 as being mounted in a pick-up truck T having a camper C mounted therewith. The automatic battery charging control device A is illustrated schematically in FIG. 1 as being disposed between a generator or alternator G and a first battery B-1 which is used for starting the engine for the truck T and a second battery B-2 which is used for operating accessories in the camper C. In FIG. 1 the accessories in the camper C are illustrated simply as a light bulb L, although it will be appreciated from the more detailed description hereinafter that the accessories may be varied, and the arrangement of the electrical circuits and system employing the automatic battery charging control device A may likewise be varied from that illustrated by way of example only in FIG. 1 of the drawings.

Figure 4:
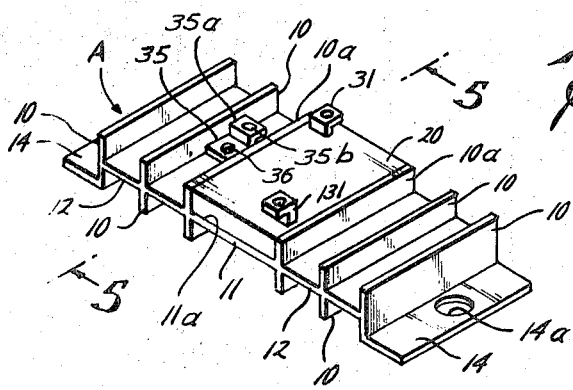
FIG. 4 is an isometric view of the preferred form of the automatic battery charging control device of the present invention.
Figure 5:
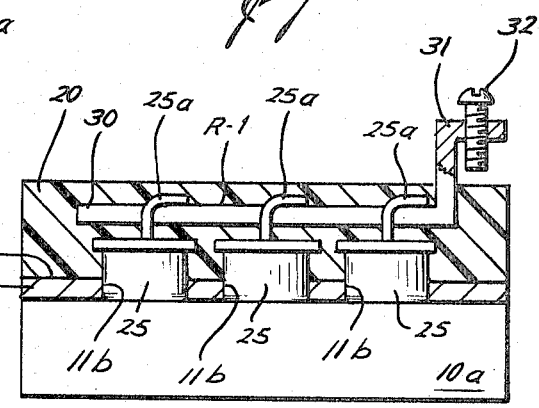
FIG. 5 is a sectional view taken on line 5—5 to illustrate details of the device illustrated in FIG. 4.
Figure 6:
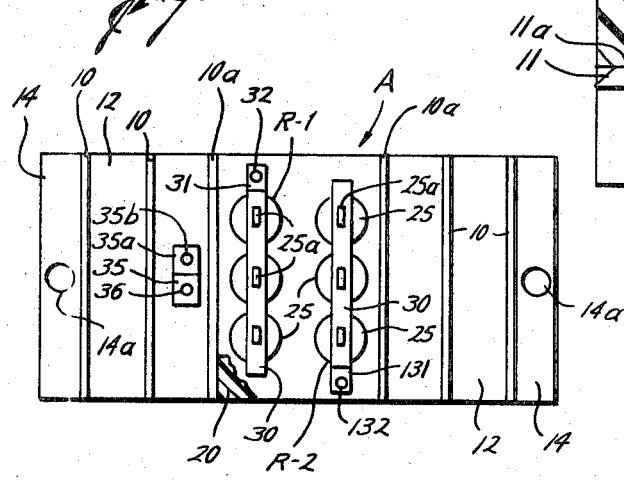
FIG. 6 is a plan view of the device of FIG. 4, with a portion of the central part of the device removed to show details thereof.

Considering the invention more in detail, reference is first made to FIGS. 4–6 of the drawings, wherein the preferred form of the automatic battery charging control device A is illustrated in detail. As illustrated, the control device A preferably includes an integral structure formed of extruded aluminum or similar material which has a plurality of upstanding ribs 10 which are formed integrally with a base plate 11 and laterally extending base extensions 12 on either side of the base 11. It is to be noted that the ribs or fins 10 extend upwardly and downwardly with respect to the extensions 12 and base 11 and they serve as heat dissipating means, as will be more evident hereinafter. The outer ribs or fins 10 are formed with laterally extending mounting flanges 14, each of which has an opening 14a therein for receiving a screw or bolt to thereby mount the control device A in any suitable position for use.

The innermost central ribs or fins 10a are spaced further apart than the other ribs or fins 10 and define, together with the base portion 11, a recess 11a for receiving a first rectifier R-1 and a second rectifier R-2, the details of which will be explained, both of which are embedded in a suitable type of potting compound such as phenol formaldehyde resin or an epoxy resin 20.

In the form of the invention illustrated in the drawings, each of the rectifiers R-1 and R-2 is formed with a plurality of diodes or rectifier elements 25 which are suitably threaded or press-fitted into openings 11b in the base 11. The electrical leads 25a for each of the diodes or rectifier elements 25 is connected electrically to a bus bar formed of copper or similar electrical conducting material indicated at 30, and to which is connected a first output terminal 31 having a screw or other wire holding means 32 therewith.

The second rectifier R-2 is formed in the same manner as the first rectifier R-1 and like parts bear the same designations for both rectifiers R-1 and R-2, except that the second output terminal is designated 131 and the second wire holding means therewith is designated 132.

A common input terminal 35 is mounted on one of the lateral extensions 12, or the base 11 if preferred, by means of a screw 36 or other attachment means so that there is direct electrical connection with the rectifier elements or diodes 25 through the electrical conduction provided by the metal conducting material of the base 11 and the lateral extension 12. Such common input terminal 35 is thus directly connected to both of the rectifiers R-1 and R-2. Normally, the terminal 35 has a substantially "L"-shaped portion 35a for receiving a retaining screw or other attachment means (not shown) for receiving an electrical wire connection as will be more fully explained. A screw similar to that illustrated at 32 in FIG. 5 would normally be inserted in the threaded opening 35b for the attachment of an electrical wire or connection to the input terminal 35. Although the invention is illustrated with only two rectifiers a third or greater number of rectifiers may be employed, each with its respective output terminal and means for connection to the input terminal.

In FIG. 2, one electrical system employing the automatic battery charging control device A of this invention is illustrated, wherein a conventional generator G, and its field 40 are connected through a voltage regulator 41 of any conventional construction to the control device A at the common input terminal 35 so that all of the charging current from the generator passes through such terminal 35 to enable the voltage regulator 41 or other current limiting device to provide its current limiting function to the total generator output. The rectifiers R-1 and R-2 are further illustrated in FIG. 2 as electrically connected through the common input terminal 35 to the generator G. The first rectifier R-1, which may take the form illustrated in detail in FIGS. 4-6, has a first output terminal 31, while the second rectifier R-2, which likewise may take the form illustrated in FIGS. 4-6, has a second output terminal 131. The first output terminal 31 is connected to the first battery B-1 while the second output terminal 131 is connected to the second battery B-2. The motor starter which is normally employed for starting the engine in a vehicle is indicated at M in FIG. 2 and is connected in the circuit with the battery B-1. A typical ignition switch 42 is connected through a solenoid switch 43 to the output terminal 131 and also the battery B-2. The ignition switch 42 is connected to a solenoid 45 so that when the switch 42 is closed, the battery B-2 provides the energization for closing the solenoid 45 to complete the circuit from the battery B-1 to the starting motor M. If desired, ammeters 46 and 47 may be provided in the electrical circuits for indicating the current flow from the batteries B-1 and B-2, respectively. It will be evident that the position of the ammeter in FIG. 2 may be changed in certain applications if current flow exceeds ammeter ratings in the present position or if the illustrated position does not allow for measurement of all current to or from the battery.

It is evident that there are two separate sources of power, namely, battery B-1 and battery B-2 which provide power to their own respective loads but which are both charged from a common source through the automatic battery charging control device A. The rectifiers permit current to flow to the batteries for charging but block current flow in the other direction.

This device may then be added to any existing automotive electrical system, whether alternator or generator, six volts or 12 volts.

The schematic illustrations in FIGS. 2 and 3 show negative ground systems. For positive ground systems, the rectifiers shown would be reversed, with cathode toward generator to allow current for charging to flow in the opposite direction.

Assuming the vehicle electrical system is six volts, and the starting motor M is to be started with only six volts, a starting switch 50 is left in the open position illustrated in FIG. 2, but if the starting motor only is 12 volts, or if for other reasons twelve volt starting is desired, the switch 50 may be closed so that the battery B-2 energizes solenoid 51 to move the solenoid switch from the position shown in FIG. 2 in solid lines at 52 to the dotted line position at 52a. Then, with the ignition switch 42 closed, the batteries B-2 and B-1 are connected in series through the closed solenoid switch 45 to the starting motor M to provide the combined voltage of twelve volts from the two six-volt batteries B-1 and B-2.

The accessories L are illustrated in FIG. 2 by a resistance since they may take numerous forms, and it will be seen that the battery B-2 provides the normal electrical voltage for such accessories L. Switches are not indicated in connection with the accessories L, but suitable, conventional switches may be employed for turning the accessories on and off.

It is evident then that regardless of normal vehicle voltage, six volts or 12 volts, the switch 50, the solenoid 51 and switch 52 are used to provide twice the normal vehicle voltage to the starter motor while still providing normal voltage to accessories.

Should either of the batteries B-1 or B-2 be discharged, it may be desirable to obtain power from the other battery automatically without having to use a jumper cable. For this purpose, a special emergency battery switch circuit consisting of switch 55, rectifiers 56 and 57, solenoid switch 58, and an indicator light 59 are employed. Normally, the switch 55 is open and the indicator light 59 is not lit. The switch 58 is also in the open position illustrated in FIG. 2 when the switch 55 is open. Thus, in the event the battery B-2 is dead or weak, and it is desired to operate the accessories L, the switch 55 may be moved to the closed position which will turn on the indicator light 59 and will close the solenoid switch 58 so that the battery B-1 is then electrically connected through the solenoid switches 58 and 43 to the accessories L. If, on the other hand, the battery B-1 is dead or weak, and it is desired to use the battery B-2 for starting the motor M, the switch 55 may be closed so that the indicator light 59 is on and the switch 58 is closed, whereby the battery B-2 is connected through the ignition switch 42 to initially close the solenoid 45 and so as to then connect electrically the battery B-2 through the solenoid switches 45 and 58 with the motor starter M. The switch 55 and the light 59 would normally be mounted inside the vehicle so the system may be used in emergency when one battery has become discharged through a short circuit or negligence in leaving on an accessory such as lights for an extended period of time. The pilot light 59 could be labeled "Emergency Battery" and would provide a warning that the emergency battery system is being used and battery or electrical service should be obtained as soon as possible so that the system may be returned to normal.

The arrangement of rectifiers 56 and 57 is such that a common connection is provided for the switch 55 and at the same time current leak from one battery to the other is prevented.

Therefore the solenoid 58 and light 59 obtain power from either battery or both batteries automatically no matter which is discharged.

The present invention may also be employed for charging an external battery indicated at B-3 with suitable plug-in connections 60 and 61 of any conventional type. A rectifier or diode 62' is provided in the circuit to the electrical contact or connector 60 as illustrated in FIG. 2, the purpose of which is to prevent current from the battery B-3 from entering the vehicle electrical system while allowing current to pass from the vehicle electrical system into the battery B-3. Assuming the battery B-3 is a 12-volt battery and each of batteries B-1 and B-2 in the vehicle electrical system is 12 volts, and it is desired to charge the battery B-3 with 24 volts, a charging switch having movable electrical contacts 62 and 63 is moved from the off position shown in FIG. 2 to a first position with the contact 62 in engagement with an electrical contact point 64 which completes an electrical circuit from the generator G to the solenoid 51 to move the switch 52 to the position 52a. The generator G is assumed to provide 12-volts, which comes through the rectifier R-2 and the terminal output 131, and then through lead line 66, and the closed switch 52a to join in series with the battery B-1. The generator voltage of 12-volts and the battery voltage of 12-volts from the battery B-1 are thus added together to provide the 24 volts at the external battery B-3 for charging same. It is to be noted that with this circuit, the battery B-2 is in parallel with the generator and will also provide current for charging.

In some applications it will be desirable to prevent the battery B-2 from providing current to the above described charging circuit. This is done by eliminating the current path 66 or otherwise isolating it by means of a switch-either manual or electromechanical, and adding current path 166 (dotted). Then generator current is provided through path 35. 69, 166, and switch 52a to the batteries B-1 and B-3. Battery B-2 is not discharged in such application.

In the event it is desirable to provide 36 volt charging voltage, the charging switch 62 and 63 is further rotated counterclockwise to engage the electrical contact 62 with a terminal 68 and electrical contact 63 with the terminal 64. The line 69 leading from the generator G is thus connected through the electrical contact 62 to the terminal 68 and then to electrical lead line 70 which has a solenoid 71 connected therewith. The solenoid 71 is normally in the position indicated in solid lines at 72, but when the switch 62 is in engagement with the contact 68, the switch 72 moves to the dotted line position indicated at 72a. Also, the voltage from the generator G moves through the line 69, the terminal 68 and the line 75 to another solenoid 76 which controls the switch 43 to switch it from the position shown in solid lines in FIG. 2 to the dotted line position 43a. In the dotted line position 43a, the generator G is supplying only 12-volts to either the accessories L or the ignition system through the switch 42, even though 36 volts are being supplied to the battery B-3. The electrical contact 63 causes the circuit to be complete from the generator through the solenoid 51 to move the switch 52 to the position shown in 52a. Thus, the generator voltage flows through the line 77, the closed switch 72a and is in series with the battery B-2 which flow together through the line 66 and the closed switch 52a to join in series with the battery B-1 so that the 36 volts are supplied to the terminals 60 and 61 for charging the battery B-3. It should be understood that the vehicle engine should have been started before charging switches are operated to prevent charging voltage across the starting motor M.

In FIG. 3, another form of the electrical system of this invention employing the control device A is illustrated to further illustrate various applications in which the control device A may be utilized. An alternator G-1 is shown schematically with connections to a typical regulator 141 in the known manner. The control device A is connected by an electrical lead line 80 which extends from the alternator line 81 to the common input terminal 35. It is to be noted that because the control device A includes the two rectifiers R-1 and R-2, there is an equal voltage drop in each circuit connected with the respective rectifiers R-1 and R-2, which enables the regulator 141 to provide equal charging voltage to both batteries so that if one battery is discharged, it will draw a greater amount of current than the one which is charged.

In the form of the electrical system illustrated in FIG. 3, switches 82 and 83 represent the ignition and accessory switch which is common on most vehicles. When the switch 82 is closed, the solenoid 145 is energized to close the circuit from the main battery B-1 to the motor starter M. The closing of the switch 83 likewise provides power for the truck lights TL and other electrical equipment within the truck T itself from the auxiliary battery B-1.

All of the electrical power for the accessories L in the camper C or other auxiliary unit is provided by the battery B-2. Ammeters 146 and 147 for the batteries B-1 and B-2, respectively, are preferably provided.

From the foregoing illustrations of applications wherein the control device A may be utilized, it is believed evident that various electrical systems and apparatus may be operated in conjunction with the device A. With such device A, both of the batteries B-1 and B-2, and any additional batteries which may be employed in other circuits may be kept charged while also available for use separately, or in various combinations.

The term "rectifier" as used herein and in the claims includes not only the diode rectifiers previously described, but also transistors, solid state electronic devices, and other electrical devices adapted to permit the flow of electrical current in only one direction.

The term "generator" as used herein and in claims includes both generators and alternators.

The foregoing disclosure and description of the invention is illustrative and explanatory thereof and various changes in the size, shape and materials, as well as in the details of the illustrated construction, may be made within the scope of the invention.

What is claimed is:

1. An automatic battery control system for vehicles and the like, comprising:
   a. a first electrical circuit having a first battery therein;
   b. a second electrical circuit having a second battery therein;
   c. a generator;
   d. a first rectifier connected in said first electrical circuit for permitting flow of electrical current in only the one direction from said generator to said first battery and for blocking current flow in the opposite direction;
   e. a second rectifier connected in said second electrical circuit for permitting flow of electrical current in only the one direction from said generator to said second battery and for blocking current flow in the opposite direction;
   f. a common terminal connected to both said first rectifier and said second rectifier and to said generator for charging both of said batteries from the common generator as needed;
   g. said first circuit having a terminal connected to said first rectifier at the side of the first rectifier opposite from said common terminal and to which said first battery is connected;
   h. means in said first electrical circuit for connecting a first electrical load to said first battery for discharging same independently of said second battery;
   i. said second circuit having a terminal connected to said second rectifier at the side of the second rectifier opposite from said common terminal and to which said second battery is connected;

j. means in said second electrical circuit for connecting a second electrical load to said second battery for discharging same independently of said first battery;

k. switch means including a relay connected to said first electrical circuit through a first switch rectifier and connected to said second electrical circuit through a second switch rectifier so that power may be drawn from either or both of said electrical circuits to operate the relay;

l. an additional electrical circuit connecting said first and second electrical circuits in parallel through said relay when in the closed position; and m. said first and second switch rectifiers preventing said first battery and said second battery from discharging from one to the other.

2. An automatic battery control system for vehicles and the like, comprising:

a. a first electrical circuit having a first battery therein;

b. a second electrical circuit having a second battery therein;

c. a generator;

d. a first rectifier connected in said first electrical circuit for permitting flow of electrical current in only the one direction from said generator to said first battery and for blocking current flow in the opposite direction;

e. a second rectifier connected in said second electrical circuit for permitting flow of electrical current in only the one direction from said generator to said second battery and for blocking current flow in the opposite direction;

f. a common terminal connected to both said first rectifier and said second rectifier and to said generator for charging both of said batteries from the common generator as needed;

g. said first circuit having a terminal connected to said first rectifier at the side of the first rectifier opposite from said common terminal and to which said first battery is connected;

h. means in said first electrical circuit for connecting a first electrical load to said first battery for discharging same independently of said second battery;

i. said second circuit having a terminal connected to said second rectifier at the side of the second rectifier opposite from said common terminal and to which said second battery is connected;

j. means in said second electrical circuit for connecting a second electrical load to said second battery for discharging same in dependently of said first battery;

k. said generator being connected to said common terminal for charging each of said batteries and furnishing current for each of said electrical loads through its respective rectifier;

l. a third electrical circuit connected to said first electrical circuit and having a third battery therein;

m. means for selectively connecting said first and second electrical circuit and generator in series for charging a third battery; and n. means for isolating the third electrical circuit to prevent the third battery from discharging into said first and second electrical circuits and generator circuit.

* * * * *